(12) United States Patent
Endo (10) Patent No.: US 10,403,071 B2
(45) Date of Patent: Sep. 3, 2019

(54) CONTROL SYSTEM, IN-VEHICLE DEVICE AND ELECTRONIC KEY

(71) Applicant: TOYOTA JIDOSHA KABUSHIKI KAISHA, Toyota-shi, Aichi-ken (JP)

(72) Inventor: Takeo Endo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/991,517

(22) Filed: May 29, 2018

(65) Prior Publication Data

US 2018/0350176 A1  Dec. 6, 2018

(30) Foreign Application Priority Data

Jun. 5, 2017  (JP) .................. 2017-110724

(51) Int. Cl.
*G05B 19/00* (2006.01)
*G07C 9/00* (2006.01)
*B60R 25/24* (2013.01)

(52) U.S. Cl.
CPC .......... *G07C 9/00309* (2013.01); *B60R 25/24* (2013.01); *G07C 9/00111* (2013.01); *G07C 2009/00396* (2013.01); *G07C 2009/00769* (2013.01)

(58) Field of Classification Search
CPC ............ G07C 9/00309; G07C 9/00111; G07C 2009/00396; G07C 2009/00769; B60R 25/24
USPC .......................................... 340/5.61
See application file for complete search history.

(56) References Cited

U.S. PATENT DOCUMENTS

| | | | | |
|---|---|---|---|---|
| 9,725,071 B2* | 8/2017 | Miller | ..................... | B60R 25/24 |
| 2004/0217850 A1* | 11/2004 | Perttunen | .............. | B60R 25/241 |
| | | | | 340/426.17 |
| 2006/0255908 A1* | 11/2006 | Gilbert | .................... | B60R 25/24 |
| | | | | 340/5.61 |
| 2008/0061931 A1* | 3/2008 | Hermann | ................ | B60R 25/24 |
| | | | | 340/5.72 |
| 2011/0148573 A1* | 6/2011 | Ghabra | ................. | B60R 25/245 |
| | | | | 340/5.61 |
| 2013/0254109 A1* | 9/2013 | Beiser | .................... | G06Q 20/40 |
| | | | | 705/44 |

(Continued)

FOREIGN PATENT DOCUMENTS

| | | |
|---|---|---|
| JP | H09-004292 A | 1/1997 |
| JP | 2012-227586 A | 11/2012 |
| JP | 2014-205978 A | 10/2014 |

*Primary Examiner* — Zhen Y Wu
(74) *Attorney, Agent, or Firm* — Oliff PLC (57) ABSTRACT

A control system includes: an in-vehicle device; and electronic key, wherein the in-vehicle device includes a transmission device, a first operation detection device, and a first control device programmed to determine whether the electronic key is a control target electronic key, the electronic key used to perform a locking operation, and transmit a second signal from the transmission device toward the electronic key when it is determined that the electronic key used to perform the locking operation is the control target electronic key, and the electronic key includes a reception device, and a second control device programmed to set a first mode until the reception device receives the second signal, and set a second mode when the reception device receives the second signal.

5 Claims, 5 Drawing Sheets

(56) References Cited

U.S. PATENT DOCUMENTS

| | | | |
|---|---|---|---|
| 2014/0176304 A1* | 6/2014 | Park | G07C 9/00309 340/5.61 |
| 2015/0283975 A1* | 10/2015 | Desjarlais | B60R 25/241 701/2 |
| 2016/0007408 A1* | 1/2016 | Sethi | H04B 1/3827 370/338 |
| 2016/0063784 A1 | 3/2016 | Murakami et al. | |
| 2016/0075307 A1* | 3/2016 | Jakobsson | B60R 25/31 701/2 |
| 2016/0325710 A1* | 11/2016 | Honkanen | B60R 25/2081 |
| 2017/0101076 A1* | 4/2017 | Krishnan | H04W 4/80 |
| 2017/0178035 A1* | 6/2017 | Grimm | H04L 63/061 |
| 2017/0200335 A1* | 7/2017 | Da Deppo | G07C 9/00309 |
| 2017/0247016 A1* | 8/2017 | Krishnan | H04W 4/80 |
| 2017/0352215 A1* | 12/2017 | Maiwand | G07C 9/00896 |
| 2017/0358159 A1* | 12/2017 | Hanson | G07C 9/00309 |
| 2018/0134253 A1* | 5/2018 | Zielinski | B60R 25/241 |

\* cited by examiner

CONTROL SYSTEM, IN-VEHICLE DEVICE AND ELECTRONIC KEY

INCORPORATION BY REFERENCE

The disclosure of Japanese Patent Application No. 2017-110724 filed on Jun. 5, 2017 including the specification, drawings and abstract is incorporated herein by reference in its entirety.

BACKGROUND

1. Technical Field

The disclosure relates to a control system, an in-vehicle device and an electronic key.

2. Description of Related Art

A smart entry system (referred to also as an electronic key system, a wireless key system, a keyless entry system or the like) is one of vehicular control systems. In this smart entry system, an electronic key carried by a user and an in-vehicle device installed in a vehicle carry out a collation process via radio communication, and control a vehicle based on a result of the collation. There are related arts, for example, as disclosed in Japanese Patent Application Publication No. 2014-205978 (JP 2014-205978 A) and Japanese Patent Application Publication No. 2012-227586 (JP 2012-227586 A).

In the smart entry system, the in-vehicle device transmits a request signal toward a detection area regularly (polling transmission) or in response to a user's operation (performed on a switch or sensor on a door handle). Upon receiving the request signal from the in-vehicle device through entry into the detection area or the like, the electronic key returns a response signal including information specific to the key to the in-vehicle device. Then, upon receiving the response signal from the electronic key, the in-vehicle device authenticates the electronic key by collating the information specific to the key, which is included in the response signal, with information registered in advance in the in-vehicle device.

SUMMARY

As described above, the electronic key of the smart entry system needs to stand by so that the request signal transmitted from the in-vehicle device can be received at any time. Therefore, the electronic key is required to consume electric power to activate a circuit that carries out a standby process. As a result, it is difficult to prolong the life of the electronic key by restraining a battery built therein from being drained.

Besides, the electronic key that holds the standby process active in this manner may receive a fraudulent access resulting from a fraudulent electric wave.

In an art described in the aforementioned Japanese Patent Application Publication No. 2014-205978 (JP 2014-205978 A), a capacity of a battery built in an electronic key is detected, and the control for restraining the battery from being drained is performed when the remaining capacity of the battery falls to a reference value. However, with the remaining capacity of the battery being sufficient, the electronic key holds a standby process active. Therefore, the battery cannot be restrained from being drained, due to the continuous consumption of electric power. Besides, the electronic key may receive a fraudulent access.

In an art described in the aforementioned Japanese Patent Application Publication No. 2012-227586 (JP 2012-227586 A), a sensor that detects vibrations of an electronic key is used, and the control for restraining a battery from being drained is performed when the electronic key does not vibrate. However, while vibrating, the electronic key holds a standby process active. Therefore, the battery cannot be restrained from being drained, due to the continuous consumption of electric power. Besides, the electronic key may receive a fraudulent access. Furthermore, the vibration detection sensor needs to be built into the electronic key, so the cost of the electronic key becomes high.

The disclosure provides a vehicular control system that restrains a battery from being drained by reducing the amount of electric power consumed by an electronic key and that suppresses a fraudulent access to the electronic key after a door of a vehicle is locked.

A vehicular control system according to a first aspect of the disclosure includes an in-vehicle device mounted in a vehicle; and at least one electronic key, wherein the in-vehicle device includes a transmission device configured to transmit a first signal and a second signal to the electronic key, a first operation detection device configured to detect an operation of locking a door of the vehicle, and a first control device programmed to determine whether or not the electronic key is a control target electronic key determined in advance, the electronic key used to perform a locking operation detected by the first operation detection device, and transmit the second signal from the transmission device toward the electronic key determined as the control target electronic key, when it is determined that the electronic key used to perform the locking operation is the control target electronic key, and the electronic key includes a reception device configured to receive the first signal and the second signal from the in-vehicle device, and a second control device programmed to set a first mode until the reception device receives the second signal, and set a second mode when the reception device receives the second signal, the first mode being operating state for carrying out a process of receiving the first signal, the second mode being operating state for refraining from carrying out the process of receiving the first signal.

According to the above aspect, the electronic key capable of selectively setting the first mode and the second mode as the operating state is used. In the first mode, the electronic key can carry out the process of receiving the first signal transmitted from the in-vehicle device. In the second mode, the electronic key refrains from carrying out the process of receiving the first signal transmitted from the in-vehicle device. The control for setting the operating state of the electronic key to the second mode is performed by detecting the operation of locking the door of the vehicle through the use of the electronic key as a control target in the in-vehicle device.

When the locking operation using the electronic key as the control target is performed through this control, the operating state of the electronic key as the control target is unconditionally set to the second mode. Accordingly, the electronic key set in the second mode refrains from carrying out the process of receiving the first signal transmitted from the in-vehicle device, and therefore can be prevented from receiving a fraudulent electric wave plotting a fraudulent access. Besides, the electronic key set in the second mode refrains from carrying out the process of receiving the first signal transmitted from the in-vehicle device, and therefore can reduce the amount of electric power consumption for this reception process. Besides, there is no need to build a vibration detection sensor or the like into the electronic key, so the cost of the electronic key does not become high.

In the aforementioned aspect of the disclosure, the electronic key may be configured to shut off supply of electric power to a circuit that carries out a standby process for the first signal transmitted from the in-vehicle device, in the second mode. Owing to this control, with the electronic key in the second mode, the amount of electric power consumed by the circuit that carries out the standby process for standing by so that the first signal transmitted from the in-vehicle device can be received at any time can be made equal to zero. In consequence, the amount of electric power consumed by the electronic key can be significantly reduced.

In the aforementioned aspect of the disclosure, the in-vehicle device may further include a storage unit configured to register in advance the control target electronic key to which the in-vehicle device transmits the second signal. As described hitherto, when the electronic key as the control target selected from one or more electronic keys is registered in advance into the storage unit, only the electronic key that is needed at the time of the performance of the locking operation can be appropriately set in the second mode.

In the aforementioned aspect of the disclosure, the electronic key may further include a second operation detection device configured to detect a predetermined key operation performed on the electronic key, and the second control device may be programmed to set the operating state to the first mode when the second operation detection unit detects the key operation. Owing to this control, the operating state of the electronic key can be returned to the first mode with the second mode cancelled, simply by performing the predetermined key operation. In consequence, a user does not need to perform any complicated operation to cancel the second mode, so the convenience for the user is not sacrificed.

An in-vehicle device according to a second aspect of the disclosure is mounted in a vehicle, and includes a transmission device configured to transmit a first signal and a second signal to an electronic key; an operation detection device configured to detect an operation of locking a door of the vehicle; a control device programmed to determine whether or not the electronic key used to perform a locking operation detected by the operation detection device is a control target electronic key determined in advance; and transmit the second signal from the transmission device toward the electronic key determined as the control target electronic key, when it is determined that the electronic key used to perform the locking operation is the control target electronic key.

An electronic key according to a third aspect of the disclosure includes a reception device configured to receive a first signal and a second signal from an in-vehicle device mounted in a vehicle; and a control device programmed to set a first mode until the reception unit receives the second signal, and set a second mode when the reception unit receives the second signal, the first mode being operating state for carrying out a process of receiving the first signal transmitted from the in-vehicle device, the second mode being operating state for refraining from carrying out the process of receiving the first signal.

As described above, the vehicular control system according to the disclosure can restrain a battery from being drained by reducing the amount of electric power consumed by the electronic key, and prevent a fraudulent access to the electronic key after the door of the vehicle is locked.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

A vehicular control system according to the disclosure shifts an electronic key to a state where a signal from an in-vehicle device cannot be received, when an operation of locking a door of a vehicle is performed through the use of a predetermined electronic key. Thus, a fraudulent access to the electronic key can be prevented. Besides, the consumption of electric power can be suppressed by inactivating a process of receiving a signal from the in-vehicle device, and the life of the electronic key can be prolonged by restraining a battery built in the electronic key from being drained.

Figure 1:
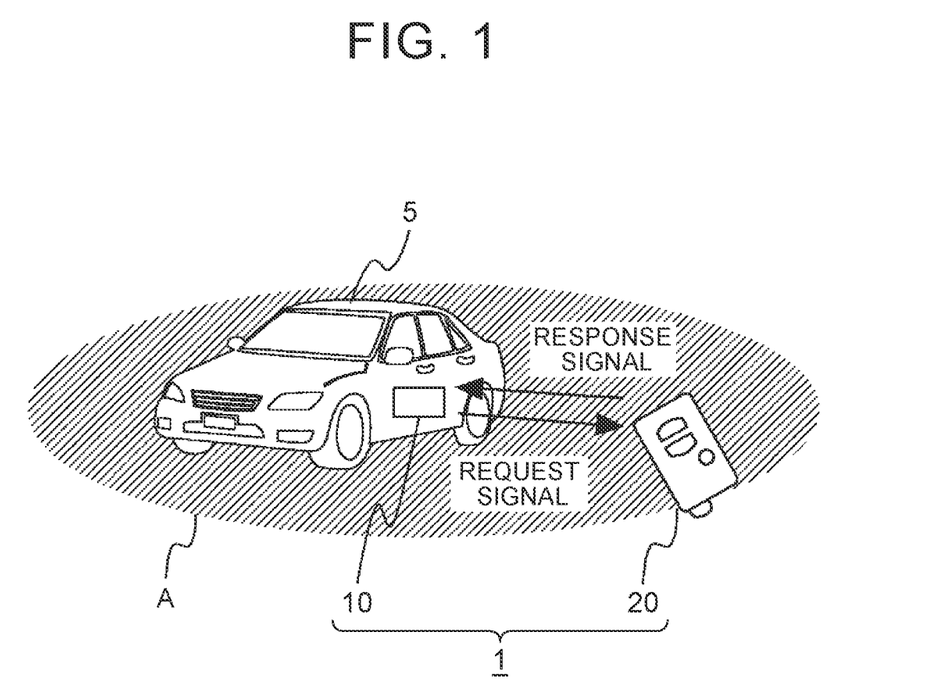
FIG. 1 is a view illustrating the general configuration of a vehicular control system according to the embodiment of the disclosure.

FIG. 1 is a view illustrating the general configuration of a vehicular control system 1 according to one embodiment of the disclosure. In FIG. 1, the present vehicular control system 1 is configured to be equipped with an in-vehicle device 10 that is mounted in a vehicle 5, and at least one portable electronic key (referred to also as a portable device) 20 that is carried by a user or the like.

The vehicular control system 1 according to the present embodiment of the disclosure is a so-called smart entry system that realizes predetermined kinds of vehicle control (the unlocking and locking of a vehicle door, the start of an engine, and the like) without the necessity for the operation of a mechanical key, by carrying out authentication between the in-vehicle device 10 and the electronic key 20 through the use of an identifier (ID) specific to the key. The authentication is carried out by this smart entry system, for example, as follows, through the use of the key identifier.

The in-vehicle device 10 transmits a predetermined request signal to the electronic key 20 that exists in a detection area A around the vehicle 5. Upon receiving the request signal from the in-vehicle device 10, the electronic key 20 transmits a predetermined response signal including the key identifier specific thereto to the in-vehicle device 10. Upon receiving the response signal from the electronic key 20, the in-vehicle device 10 collates the key identifier included in the signal with a key identifier registered in advance in the in-vehicle device 10. Then, when both the key identifiers coincide with each other, the in-vehicle device 10 authenticates the electronic key 20 that has returned the response signal, as a legitimate electronic key.

Figure 2:
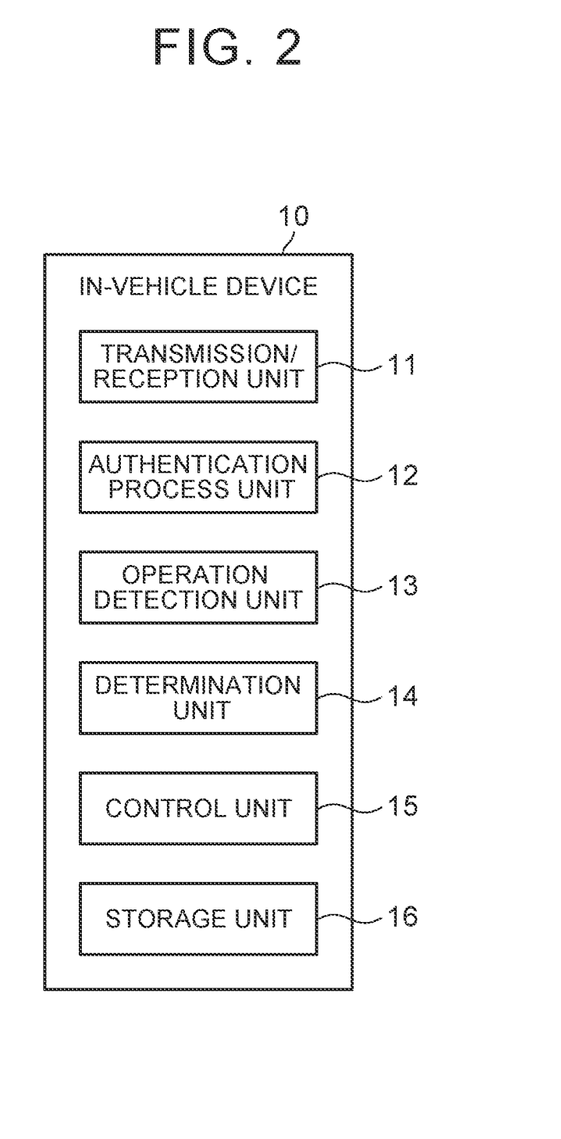
FIG. 2 is a view showing a configuration example of an in-vehicle device.

FIG. 2 shows a configuration example of the in-vehicle device 10. The in-vehicle device 10 shown in FIG. 2 is equipped with a transmission-reception unit 11, an authentication process unit 12, an operation detection unit 13, a determination unit 14, a control unit 15, and a storage unit 16.

The transmission-reception unit 11 can transmit a request signal to the detection area. The request signal is a signal requesting the transmission of a response signal including the key identifier to the electronic key 20 that exists around the vehicle 5. This request signal is an LF signal transmitted through, for example, low-frequency communication. Besides, the transmission-reception unit 11 can receive the response signal transmitted from the electronic key 20. The response signal includes at least the key identifier specifically allocated to the electronic key 20 that has transmitted the response signal. The key identifier included in the response signal is output from the transmission-reception unit 11 to the authentication process unit 12.

Besides, the transmission-reception unit 11 can transmit a key control signal (which will be described later) indicating the operating state of the predetermined electronic key 20 to the detection area, based on a command from the control unit 15. This key control signal is, for example, an LF signal transmitted through low-frequency communication.

The authentication process unit 12 collates the key identifier included in the response signal received by the transmission-reception unit 11 with the key identifier stored in advance in the storage unit 16 or the like. Then, upon succeeding in collation on the ground that both the key identifiers coincide with each other, the authentication process unit 12 authenticates the electronic key 20 that has transmitted the response signal, as a legitimate component. Information on this authenticated electronic key 20 (the key identifier) is output from the authentication process unit 12 to the determination unit 14.

The storage unit 16 is, for example, a memory. The key identifier for specifying the legitimate electronic key 20 allowed to perform a vehicle operation on the vehicle 5 is stored in advance in the storage unit 16. Besides, the electronic key 20 as a control target to be controlled by the control unit 15 (hereinafter referred to as "a control target electronic key 20*t*") is registered in advance in the storage unit 16. This control target electronic key 20*t* can be registered in the form of a key identifier or the like.

The control target electronic key 20*t* registered in this storage unit 16 is preferably the electronic key 20 that is desired to be prolonged in life by reducing the amount of electric power consumption and restraining the built-in battery from being drained. This control target electronic key 20*t* may constitute the entirety or part of the legitimate electronic key 20. The method of registering the control target electronic key 20*t* into the storage unit 16 is not limited in particular. For example, this registration may be carried out through a determination on a special operation performed by the electronic key 20 (three-time consecutive transmission of a door locking signal within a predetermined short time or the like) by the in-vehicle device 10, or through the use of a diagnosis tool in a repair plant or the like.

The operation detection unit 13 can detect a vehicle operation performed on a door of the vehicle 5, through the use of the electronic key 20 outside the vehicle. In more concrete terms, the operation detection unit 13 can detect an act of contact between the fingers, hand or the like of the user having the electronic key 20 and a predetermined touch sensor (not shown) installed on a door handle or the like outside the vehicle (hereinafter referred to as "a door locking operation") with a view to requesting the locking of the door. Incidentally, it can be determined, by antennae (not shown) inside and outside the vehicle, whether the electronic key 20 exists inside or outside the vehicle 5. When the operation detection unit 13 detects the door locking operation, the determination unit 14 is notified thereof.

Incidentally, in the foregoing description, the case where the user performs the door locking operation through contact with the door handle (the touch sensor) of the vehicle 5 has been described. Alternatively, however, the door locking operation may be performed through wireless transmission of a command signal from the electronic key 20 to the in-vehicle device 10 by, for example, depressing a door locking switch (not shown) provided on the electronic key 20.

The determination unit 14 allows the notification of detection of the door locking operation and information on the authenticated electronic key 20 to be input thereto from the operation detection unit 13 and the authentication process unit 12 respectively. Then, the determination unit 14 determines whether or not the electronic key 20 used to perform the door locking operation detected by the operation detection unit 13 corresponds to the control target electronic key 20*t* registered in advance in the storage unit 16. This determination can be made depending on, for example, whether or not the key identifiers of both the electronic keys coincide with each other. If it is determined that the electronic key 20 used to perform the door locking operation is the control target electronic key 20*t*, the result of the determination is output from the determination unit 14 to the control unit 15.

The control unit 15 controls the operating state of the control target electronic key 20*t*, based on the result obtained by the determination unit 14 that has determined that the electronic key 20 used to perform the door locking operation is the control target electronic key 20*t*. In more concrete terms, the control unit 15 commands the transmission-reception unit 11 to transmit a predetermined key control signal (which corresponds to "the second signal" in the claims) toward the control target electronic key 20*t*. It should be noted herein that the key control signal is a command for setting the control target electronic key 20*t* to an operating state determined in advance. The operating state of this control target electronic key 20*t* will be described later.

Incidentally, the transmission-reception unit 11, the authentication process unit 12, the operation detection unit 13, the determination unit 14, the control unit 15, and the storage unit 16, which have been described above, can be entirely or partially configured as an electronic control unit (an ECU) typically including a central processing unit (a CPU), a memory, an input/output interface and the like. In this electronic control unit, predetermined functions are realized when the CPU reads out and executes a predetermined program stored in the memory.

Figure 3:
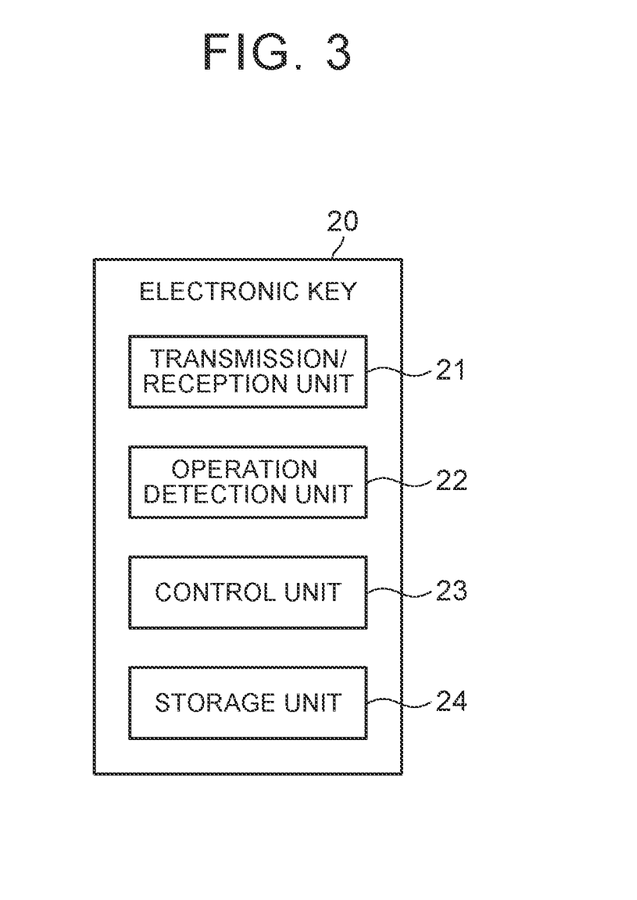
FIG. 3 is a view showing a configuration example of an electronic key.

FIG. 3 shows a configuration example of the electronic key 20. The electronic key 20 shown in FIG. 3 is equipped with a transmission-reception unit 21, an operation detection unit 22, a control unit 23, and a storage unit 24.

Among one or more electronic keys 20 constituting the vehicular control system 1, at least the electronic key registered in the in-vehicle device 10 as the control target electronic key 20*t* has a first mode (a standby mode) and a second mode (a power-saving mode), as operating states.

The first mode is an operating state where the electronic key 20 performs a process of receiving a request signal transmitted from the in-vehicle device 10 (which corresponds to "the first signal" in the claims). The performance of the process of receiving the request signal typically means the performance of a series of processes of standing by until receiving the request signal and returning a response thereto.

On the other hand, the second mode is an operating state where the electronic key 20 refrains from performing the process of receiving the request signal transmitted from the in-vehicle device 10. The refrainment from performing the process of receiving the request signal means the refrainment from performing the above-mentioned series of processes entirely or partially. The operating state in this second mode can be put into practice by, for example, stopping a standby process for standing by so that the request signal can be received from the in-vehicle device 10 at any time. The stoppage of the standby process can be realized by, for example, shutting off the supply of electric power to a circuit (not shown) that performs the standby process. Incidentally, as a method of refraining from performing the process of receiving the request signal, it is also possible, for example, to stop the process of returning the response to the received request signal, instead of stopping the standby process.

The electronic key 20 usually operates in the first mode, and shifts to the second mode upon receiving a command from the in-vehicle device 10. As described above, in the second mode, the amount of electric power consumed in the first mode by the circuit that performs the standby process can be reduced. In consequence, the amount of electric power consumed by the electronic key 20 is smaller and the built-in battery can be restrained more from being drained in the second mode than in the first mode.

In the first mode, the transmission-reception unit 21 can receive a request signal transmitted from the in-vehicle device 10. The control unit 23 is notified of the reception of the request signal by the transmission-reception unit 21. Besides, in the first mode, the transmission-reception unit 21 can transmit a response signal including the specific key identifier stored in advance in the storage unit 24 toward the in-vehicle device 10, in accordance with a command from the control unit 23. This response signal is, for example, an RF signal transmitted through radio-frequency communication.

Besides, in the first mode, the transmission-reception unit 21 can receive a key control signal indicating the operating state of the electronic key 20, which has been transmitted from the in-vehicle device 10. The control unit 23 is notified of the reception of the key control signal by the transmission-reception unit 21.

The storage unit 24 is, for example, a memory. A key identifier (an ID) specifically allocated to the legitimate electronic key 20 allowed to perform a vehicle operation on the vehicle 5 is stored in advance in the storage unit 24.

The operation detection unit 22 can detect a predetermined key operation performed on the electronic key 20. In more concrete terms, the operation detection unit 22 can detect the user's act of operating a physical switch (not shown) provided on the electronic key 20, as the predetermined key operation. In the present embodiment of the disclosure, an exemplary case where the predetermined key operation is a door unlocking operation will be described. When the operation detection unit 22 detects the door unlocking operation, the control unit 23 is notified thereof.

The control unit 23 sets the operating state of the electronic key 20. In more concrete terms, the control unit 23 sets the operating state to the first mode until the transmission-reception unit 21 receives a key control signal. Then, when the transmission-reception unit 21 receives the key control signal, the control unit 23 sets the operating state to the second mode (changes over the operating state from the first mode to the second mode). Furthermore, when the operation detection unit 22 detects the door unlocking operation, the control unit 23 sets the operating state to the first mode (changes over the operating state from the second mode to the first mode).

Besides, in the first mode, upon receiving a notification of the reception of a request signal from the transmission-reception unit 21, the control unit 23 generates a response signal including the key identifier stored in the storage unit 24, and commands the transmission-reception unit 21 to transmit the response signal.

Incidentally, the transmission-reception unit 21, the operation detection unit 22, the control unit 23, and the storage unit 24, which have been described above, can be entirely or partially configured as an integrated circuit (an IC) typically including a processor, a memory and the like.

Figure 4:
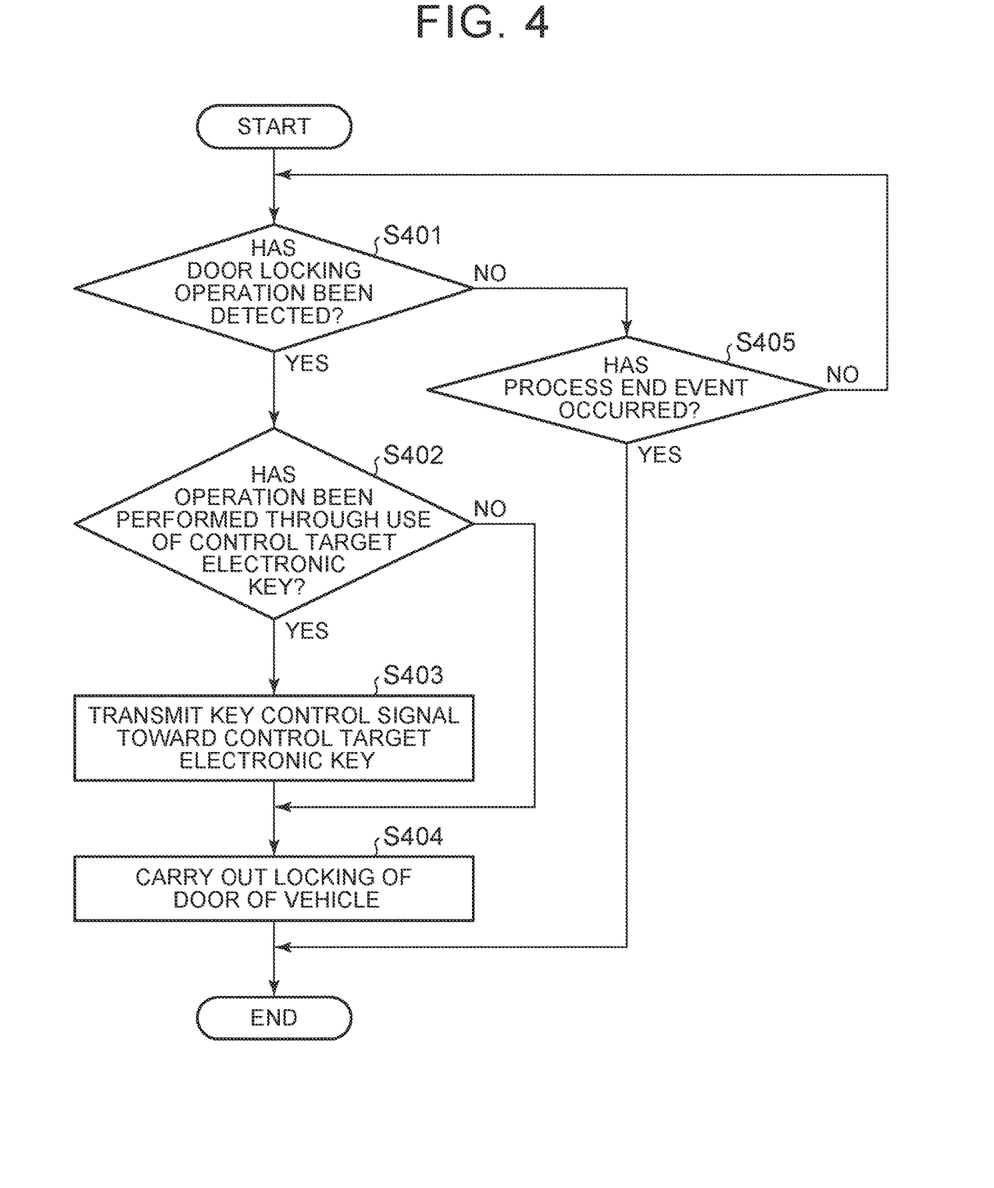
FIG. 4 is a flowchart showing a process that is carried out by the in-vehicle device.

FIG. 4 is a flowchart showing a process that is carried out by the in-vehicle device 10 of the vehicular control system 1 according to the embodiment of the disclosure.

The process shown in FIG. 4 is started by the in-vehicle device 10, for example, when the electronic key 20 authenticated by the in-vehicle device 10 moves out of a vehicle interior.

In the processing of step S401, the operation detection unit 13 of the in-vehicle device 10 determines whether or not a door locking operation has been detected. If it is determined that the door locking operation has been detected (Yes in S401), the process proceeds to step S402. On the other hand, if it is determined that no door locking operation has been detected (No in S401), the process proceeds to step S405.

In the processing of step S402, the determination unit 14 of the in-vehicle device 10 determines whether or not the door locking operation detected by the operation detection unit 13 is an operation performed through the use of the control target electronic key 20t. If it is determined that the door locking operation detected by the operation detection unit 13 is the door locking operation performed through the use of the control target electronic key 20t (Yes in S402), the process proceeds to step S403. On the other hand, if it is determined that the door locking operation detected by the operation detection unit 13 is not the door locking operation performed through the use of the control target electronic key 20t (No in S402), the process proceeds to step S404.

In the processing of step S403, the transmission-reception unit 11 and control unit 15 of the in-vehicle device 10 transmit a key control signal toward the control target electronic key 20t with a view to changing the operating state of the control target electronic key 20t. In this case, the key control signal may be transmitted to the single control target electronic key 20t used to perform the door locking operation detected by the operation detection unit 13, or to all the control target electronic keys 20t registered in the storage unit 16. When the key control signal is transmitted, the process proceeds to step S404.

In the processing of step S404, the in-vehicle device 10 locks the vehicle door in accordance with the door locking operation detected in the aforementioned step S401. Then, when the vehicle door is locked, the present process of the flowchart ends.

In the processing of step S405, the in-vehicle device 10 determines whether or not a predetermined event that forces the present process of the flowchart to be ended has occurred. The predetermined event can be, for example, a case where the authenticated electronic key 20 has moved into the vehicle interior, a case where the authenticated electronic key 20 has disappeared from the detection area, etc. If it is determined that the predetermined event has occurred, the present process of the flowchart ends. On the other hand, if it is determined that the predetermined event has not occurred, the process returns to step S401, and detection of the door locking operation is carried out again.

Figure 5:
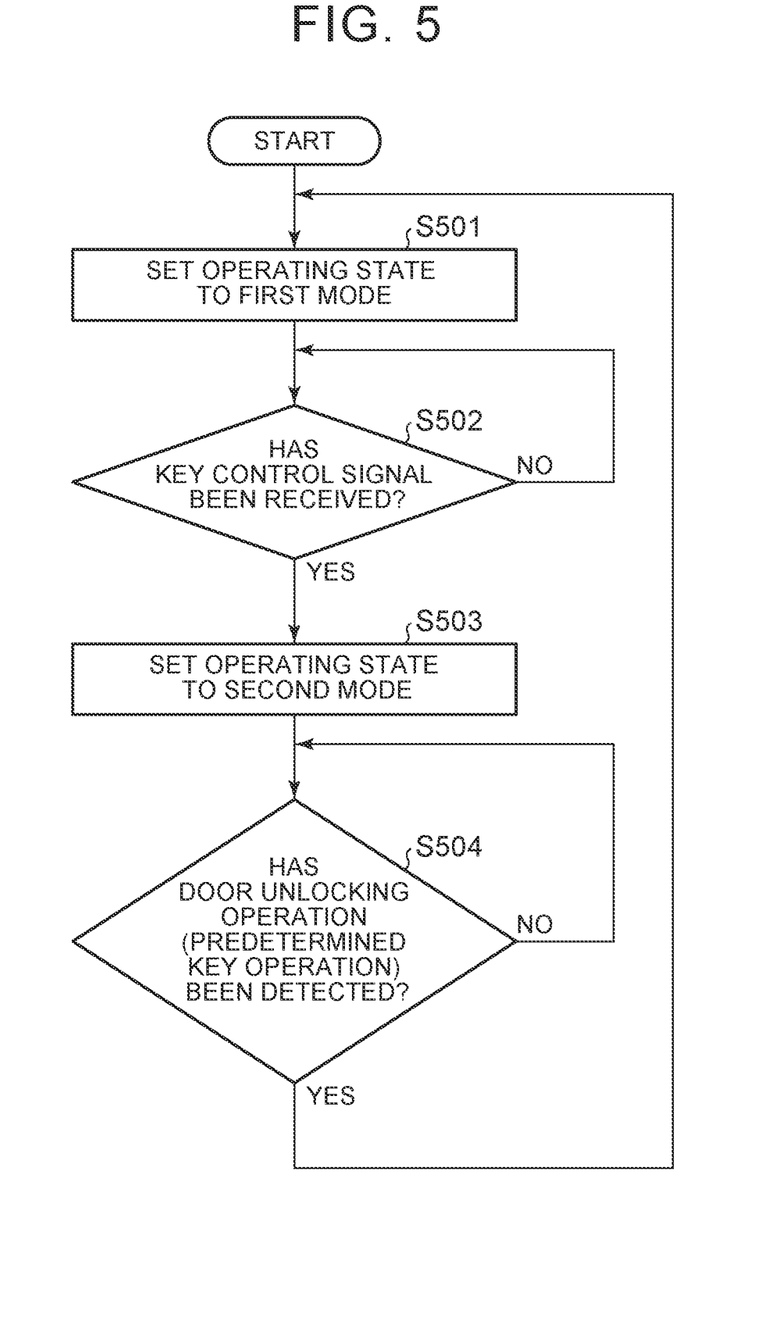
FIG. 5 is a flowchart showing a process that is carried out by the electronic key.

FIG. 5 is a flowchart showing a process that is carried out by the electronic key 20 (in concrete terms, the control target electronic key 20t) of the vehicular control system 1 according to the embodiment of the disclosure.

The process shown in FIG. 5 is started upon, for example, incorporation of a battery serving as an electric power supply into the electronic key 20, and is carried out until the drain of the battery.

In the processing of step S501, the control unit 23 of the electronic key 20 sets the operating state to the first mode. When the operating state is set to the first mode, the process proceeds to step S502.

In the processing of step S502, the transmission-reception unit 21 and control unit 23 of the electronic key 20 determine whether or not a key control signal has been received from the in-vehicle device 10. If it is determined that the key control signal has been received (Yes in S502), the process proceeds to step S503. On the other hand, if it is determined that no key control signal has been received (No in S502), the processing of the determination in step S502 is continued with the operating state held in the first mode.

In the processing of step S503, the control unit 23 of the electronic key 20 sets the operating state to the second mode. That is, the operating state is changed over from the first mode to the second mode. When the operating state is set to the second mode, the process proceeds to step S504.

In the processing of step S504, the operation detection unit 22 of the electronic key 20 determines whether or not the door unlocking operation (the predetermined key operation) has been detected. If it is determined that the door unlocking operation has been detected (Yes in S504), the process returns to step 501, and the operating state is set to the first mode. That is, the operating state is changed over from the second mode to the first mode. On the other hand, if it is determined that no door unlocking operation has been detected (No in S504), the processing of the determination in step S504 is continued with the operating state held in the second mode.

In the above-mentioned vehicular control system 1 according to the disclosure, the electronic key 20 has two operating states, namely, the first mode for making it possible to carry out the process of receiving the request signal or the like transmitted from the in-vehicle device 10 and the second mode for refraining from carrying out the process of receiving the request signal or the like transmitted from the in-vehicle device 10. Then, in response to detection of the door locking operation (the operation of locking the door of the vehicle 5) through the use of the electronic key 20 serving as the control target (the control target electronic key 20t) in the in-vehicle device 10, the operating state of the control target electronic key 20t is set to the second mode.

When the door locking operation through the use of the control target electronic key 20t (e.g., the contact between the hand or fingers and the door handle) is performed through this control, the operating state of the control target electronic key 20t is unconditionally changed over from the first mode to the second mode and set. Accordingly, the control target electronic key 20t set in the second mode refrains from carrying out the process of receiving the request signal or the like transmitted from the in-vehicle device 10, and therefore can be prevented from receiving a fraudulent electric wave plotting a fraudulent access. Besides, the control target electronic key 20t set in the second mode refrains from carrying out the process of receiving the request signal or the like transmitted from the in-vehicle device 10, and therefore can reduce the amount of electric power consumed for this reception process. In the second mode in particular, when the supply of electric power to the circuit that carries out the standby process for standing by so that the request signal from the in-vehicle device 10 can be received at any time is shut off, the amount of electric power consumption to be reduced can be made large.

In consequence, the vehicular control system 1 according to the disclosure can prevent a fraudulent access to the electronic key 20, and prolong the life of the electronic key 20 by cancelling the process of receiving the request signal or the like transmitted from the in-vehicle device 10 and restraining the battery from being drained, for example, in a situation where the vehicle 5 is out of use (e.g., the vehicle is parked) after the door locking operation is performed.

Besides, in the vehicular control system 1 according to the disclosure, the control target electronic key 20t where the second mode is set is registered in advance in the storage unit 16 of the in-vehicle device 10. Therefore, only the electronic key 20 that is needed at the time of the performance of the door locking operation can be appropriately set to the second mode.

For example, in the case of an electronic key that allows a shift to the power-saving mode (the second mode) to be manually set, when the user forgets to set the power-saving mode after a spare electronic key that is usually out of use is exceptionally used, the electronic key is left unattended for a long time with the amount of electric power consumption remaining large. In the present embodiment of the disclosure, this spare electronic key is registered in advance as the control target electronic key 20t, so an automatic shift to the power-saving mode (the second mode) is unconditionally made after this spare electronic key is exceptionally used. Therefore, the electronic key can be reliably preserved in the state of the power-saving mode.

Besides, in the vehicular control system 1 according to the disclosure, when the operation detection unit 22 of the electronic key 20 detects the predetermined key operation such as the door unlocking operation or the like, the operating state can be easily returned from the second mode to the first mode. Thus, the electronic key 20 can cancel the operating state in the second mode and return to the operating state in the first mode, simply by carrying out the simple act of, for example, pressing the switch for the door unlocking operation on the electronic key 20. In consequence, the user is not required to perform any complicated operation etc. to cancel the second mode, so the convenience for the user is not sacrificed.

Although the disclosure has been described above in detail, the foregoing description is nothing but an exemplification of the disclosure in all respects, and is not intended to limit the scope of the disclosure. It goes without saying that the disclosure can be subjected to various improvements and modifications within such a range as not to depart from the gist thereof.

The disclosure is applicable to a smart entry system etc. that controls a vehicle through radio communication between an in-vehicle device and an electronic key, and is especially useful in the case where the prolongation of the life of a battery of the electronic key, the enhancement of security of the vehicle, and the like are desired.

What is claimed is:
1. A control system comprising:
at least one electronic key; and
an in-vehicle device mounted in a vehicle, the in-vehicle device including:
a transmission device configured to transmit a first signal and a second signal to the electronic key, a first operation detection device configured to detect an operation of locking a door of the vehicle, and a first control device programmed to:

determine whether the electronic key is a control target electronic key determined in advance, the electronic key being used to perform a locking operation detected by the first operation detection device, and in response to determining that the electronic key used to perform the locking operation is the control target electronic key, transmit the second signal from the transmission device to the electronic key determined as the control target electronic key, wherein:

the electronic key includes:

a reception device configured to receive the first signal and the second signal from the in-vehicle device, and a second control device programmed to (i) set a first mode until the reception device receives the second signal, and (ii) set a second mode when the reception device receives the second signal, the first mode being an operating state configured to perform a process of receiving the first signal, the second mode being an operating state configured to not perform the process of receiving the first signal, and in the second mode, the electronic key is configured to shut off supply of electric power to a circuit that performs a standby process for the first signal transmitted from the in-vehicle device.

2. The control system according to claim 1, wherein the in-vehicle device further includes a storage device configured to store, in advance, the control target electronic key to which the in-vehicle device transmits the second signal.

3. The control system according to claim 1, wherein:

the electronic key further includes a second operation detection device configured to detect a predetermined key operation performed on the electronic key, and the second control device is programmed to set the operating state to the first mode when the second operation detection device detects the predetermined key operation.

4. The control system according to claim 1, wherein each of the first signal and the second signal is transmitted through low-frequency communication.

5. An electronic key comprising:

a reception device configured to receive a first signal and a second signal from an in-vehicle device mounted in a vehicle; and a control device programmed to set:

a first mode until the reception device receives the second signal, the first mode being an operating state configured to perform a process of receiving the first signal transmitted from the in-vehicle device, and a second mode when the reception device receives the second signal, the second mode being an operating state configured to not perform the process of receiving the first signal, and in the second mode, the electronic key is configured to shut off supply of electric power to a circuit that performs a standby process for the first signal transmitted from the in-vehicle device.

* * * * *